Feb. 7, 1939. L. J. BISHOP 2,146,615
CONVEYER
Filed Dec. 9, 1936 4 Sheets-Sheet 1
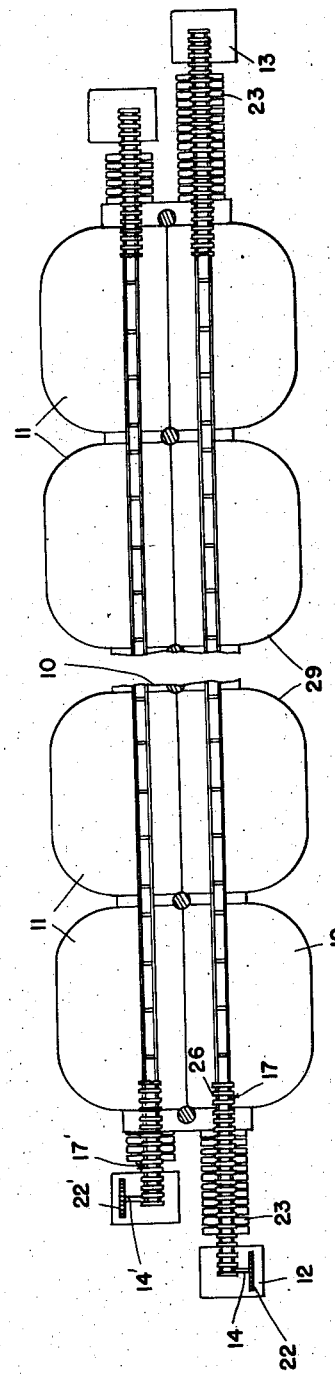
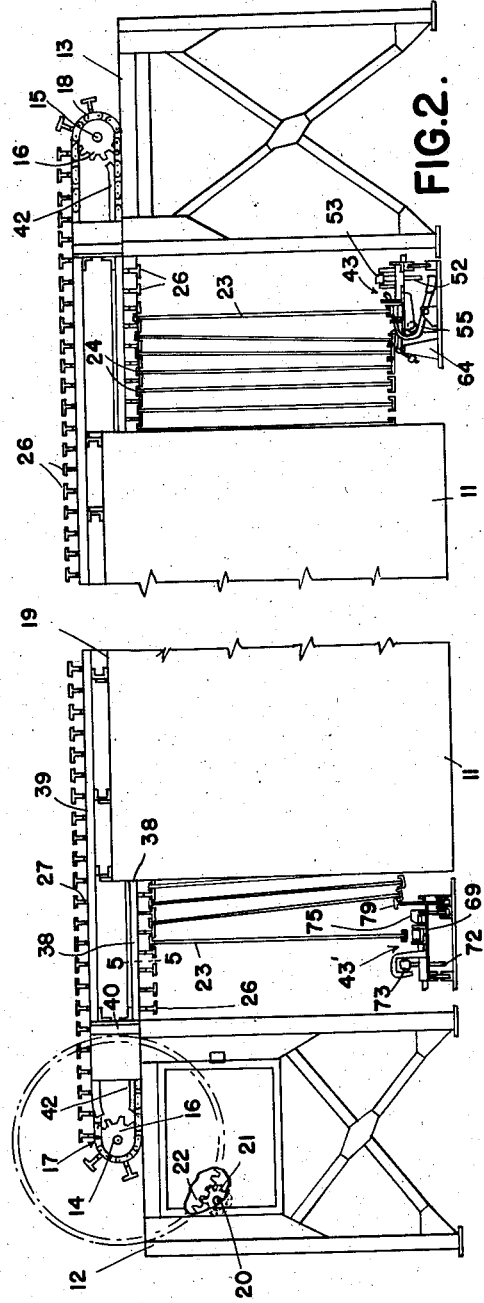
INVENTOR
LEONARD J. BISHOP
BY *Whittemore, Hulbert & Belknap*
ATTORNEYS Feb. 7, 1939. L. J. BISHOP 2,146,615
CONVEYER
Filed Dec. 9, 1936 4 Sheets-Sheet 2

INVENTOR
LEONARD J. BISHOP
BY
ATTORNEYS

Feb. 7, 1939. L. J. BISHOP 2,146,615
CONVEYER
Filed Dec. 9, 1936 4 Sheets-Sheet 3
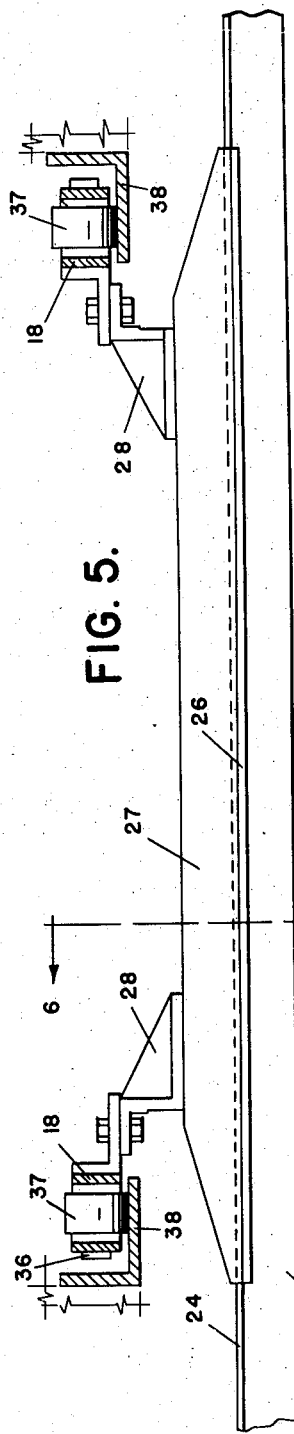
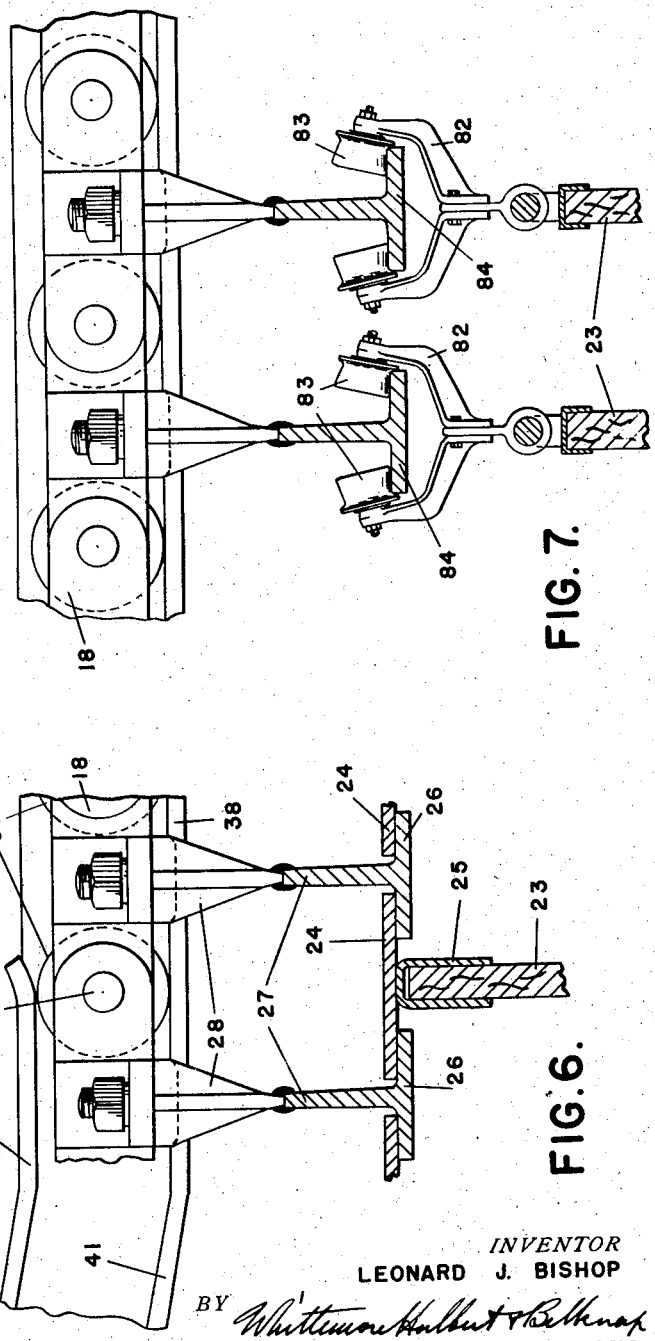
INVENTOR
LEONARD J. BISHOP
BY *Whittemore Hulbert & Belknap*
ATTORNEYS Feb. 7, 1939.   L. J. BISHOP   2,146,615
CONVEYER
Filed Dec. 9, 1936   4 Sheets-Sheet 4
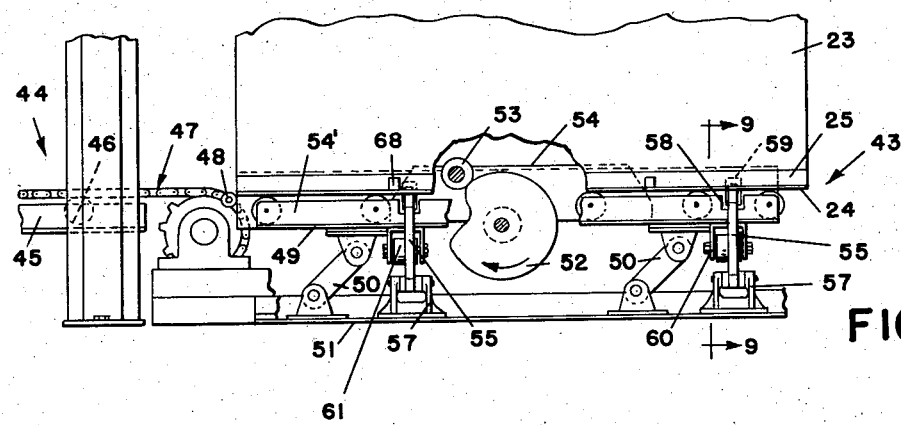
INVENTOR
LEONARD J. BISHOP
ATTORNEYS Patented Feb. 7, 1939

2,146,615

UNITED STATES PATENT OFFICE 2,146,615

CONVEYER

Leonard J. Bishop, Detroit, Mich., assignor to Mechanical Handling Systems, Inc., Detroit, Mich., a corporation of Michigan Application December 9, 1936, Serial No. 115,040

9 Claims. (Cl. 198—131)

The present invention relates to conveyers and refers more particularly to means for conveying articles to be dried through an oven, although it is apparent that the conveyers may have other applications. Specifically, the invention is applicable to conveyers used in the stretching and drying of hides and similar articles which are secured to rectangular boards or holders, the boards or holders depending in spaced parallel relation from the conveyer which carries them through the oven.

In drying ovens of the type in which the articles to be dried are carried through the oven chamber by continuously or intermittently moving traveling devices, it is desirable that they be positioned in close relation to each other in order that space may be conserved. At the same time, it is necessary that they be sufficiently spaced apart to permit free flow of hot gases therebetween, thus insuring proper heating of the articles and removal of moisture therefrom by the moving gases. It has been found that the use of conveyers from which the articles are suspended in vertical spaced relation is best suited to efficient drying, expeditious operation and minimum oven dimensions.

One of the objects of the present invention is to convey articles on special holders in spaced relation. Another object is to convey articles in this relation through heated and recirculated air in an oven chamber and to facilitate the flow of heated air through the oven and between the article supports.

Further objects of the invention are to provide novel forms of conveyer and article holders and to provide means for automatically positioning the articles on the conveyer and removing the articles from the conveyer.

Other objects will be apparent from the following description of the invention taken with the accompanying drawings illustrating one embodiment of the apparatus employed.

In the drawings:

Fig. 1 is a plan, partly broken away, showing the general layout of the oven and its associated conveyer;

Fig. 2 is an elevation of the apparatus shown in Fig. 1;

Fig. 5 is a cross section on the line 5—5 of Fig. 2;

Fig. 6 is a cross section on the line 6—6 of Fig. 5;

Fig. 7 is a view similar to Fig. 6 illustrating a modification;

Fig. 8 is a fragmentary elevation of the transfer mechanism at the loading end of the oven conveyer;

Fig. 10 is a fragmentary elevation of the transfer mechanism at the unloading end of the oven conveyer;

Fig. 11 is an end elevation of Fig. 10;

Fig. 12 is a plan of Fig. 11.

Figure 3:
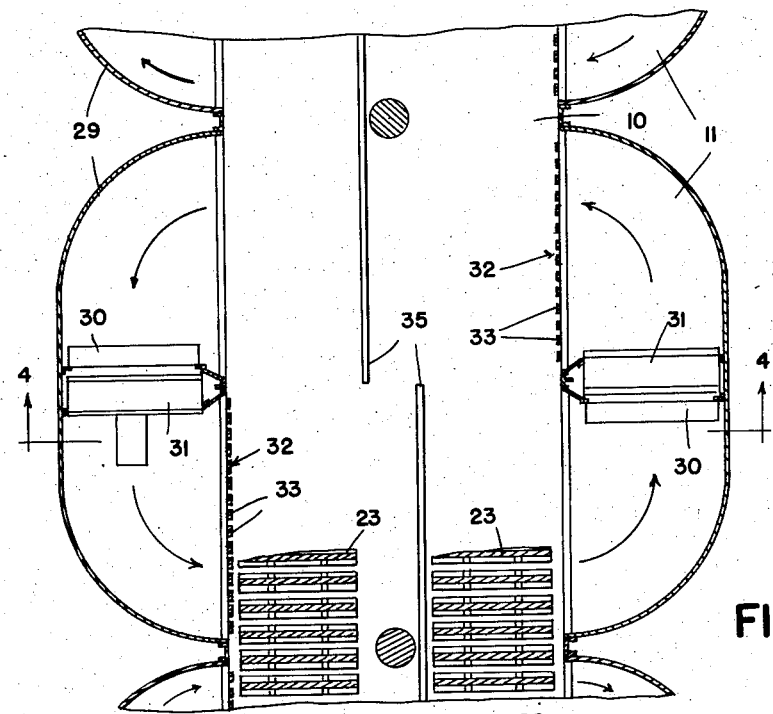
Fig. 3 is a fragmentary top sectional view of the oven and air circulating means.

Referring to the drawings, it will be seen that the oven comprises a relatively long chamber 10 having on each side thereof a number of adjacent lateral bays 11, each bay on one side of the chamber being directly opposite a bay on the other side of the chamber. Journaled on supports 12, 13, near the discharge and receiving ends of the oven are shafts 14, 15, to which are secured sprockets 16 cooperating with links in an endless traveler or conveyer 17 shown in the drawings as a pair of chains 18. These chains in the present embodiment of the invention pass under the roof 19 of the oven in one direction, and over the roof in the other direction. Means for moving the conveyer through the oven include a drive shaft 20 and gears 21, 22, fixed respectively to the shaft 20 and shaft 14.

In the drying of hides, it is customary to tack or otherwise secure the hides on large rectangular boards 23. Each of the boards in the present invention comprises a substantially flat body and laterally disposed flanges 24 at its upper and lower ends. In the enlarged view shown in Fig. 6, it will be seen that the flanges 24 are in the nature of a plate extending longitudinally of and secured centrally to U-shaped clips 25 by welding or otherwise. The clips embrace and are suitably secured to the ends of the boards and the clips together with the flange form T-shaped elements. The flanges are provided with the predeterminedly located positioning notches 24' which are engageable with shoulders to predeterminedly position the boards. The flanges on the ends of the boards are sufficiently wide to rest on flanges 26 of adjacent T-shaped bars 27 secured to brackets 28 by being welded thereon. These brackets in turn are fastened to the conveyer chains 18 at each side of the oven chamber. Bars 27 are spaced apart slightly more than the width of flanges 24, while the space between each pair of flanges 26 is greater than the width of the clip. Thus it will be seen that the boards may be easily inserted between the bars and supported therebetween by the cooperating flanges on the boards and bars.

The bays 11 previously referred to are, in effect, conduits disposed on each side of the oven chamber and designed to direct the flow of heated air in and around the oven. Each bay has rounded end walls 29 and between these end walls there are disposed in each bay a heating element 30 and a fan 31. The fans in opposite bays direct the air through the bays in opposite directions, as indicated by the arrows in Fig. 3. In this manner the air is directed by end walls 29 from the discharge of one fan to the intake of the opposite fan. On the other hand, the opposite fan withdraws the air so directed from the chamber and returns it to the chamber at a point opposite the intake of the first mentioned fan, thus producing a substantially circular flow of air in that portion of the oven chamber between the opposite bays. The fans in alternate bays on one side of the oven rotate in the same direction, while the intervening fans on that side rotate in the opposite direction. There is thus produced a series of substantially circulatory paths of heated air in contiguous regions of the oven, these paths being tangential with respect to each other and flowing in the same direction in a plane common to each pair of the contiguous regions, that is, in the plane which divides the adjacent bays from each other.

Were the heated air permitted to flow directly from the bays into the oven chamber, it is apparent that it would flow with greater force or pressure adjacent the end walls 29 and that there would be little or no flow at a point adjacent the transverse medial line of the bay. To obviate this difficulty and equalize the pressure of the air over a large area as it enters the chamber, there is provided a flow retarding means indicated at 32 in Fig. 3. In the present instance, the retarders each comprise a plurality of spaced parallel bars 33 secured to and disposed vertically along the side walls of the chamber in parallel relation to the path of travel of conveyer 17. These bars are positioned between the discharge side of the fan in each bay and the oven chamber to insure a more uniform flow and distribution of heated air between the boards passing through the oven. In lieu of spaced bars, a slotted member or other means having spaced openings may be employed if desired. There is also provided a number of baffles 34, 35, arranged longitudinally of the chamber at the top and bottom respectively thereof. These baffles project a short distance only into the chamber, it being sufficient that their edges approximately align with the top and bottom edges of boards 23 as they move through the oven suspended from conveyer 17. The heated air will then be so deflected that substantially all of the air will flow between the boards, rather than over or under them.

Figure 4:
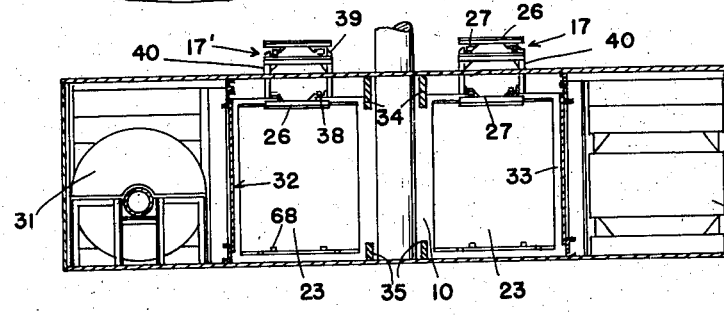
Fig. 4 is a sectional front view taken on line 4—4 of Fig. 3.

Referring to Figs. 2, 5 and 6, it will be seen that the links of the conveyer chains 18 are connected by pins or studs 36 on which are journaled rollers 37. The rollers ride on lower and upper horizontal tracks 38 and 39 at each side of the conveyer, thus maintaining the bars in horizontal relation. The tracks are formed from angle bars which are mounted on frames 40 extending above and below the roof of the oven as shown in Fig. 4. The lower track 38 is inclined at each end thereof, as at 41, so that the lower ends of the boards which are spaced but a slight distance above the floor of the oven during their passage therethrough are in raised position both before they enter the oven and after they leave the oven to facilitate their transfer to and from the oven conveyer. Disposed above the inclined tracks 41 are guides or holddowns 42 designed to hold the conveyer rollers in engagement with the track and follow a path corresponding with the horizontal portion in the oven and the inclined ends.

Figure 9:
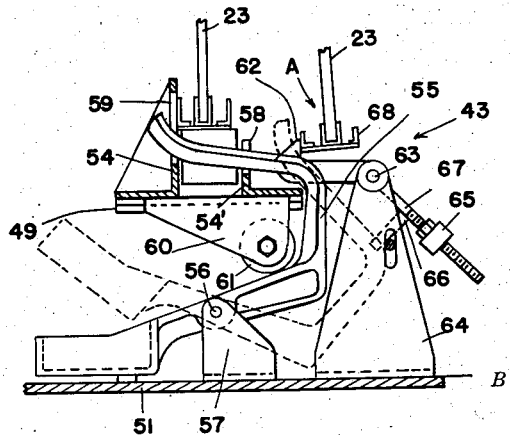
Fig. 9 is a cross section on the line 9—9 of Fig. 8.

Disposed at the receiving and discharge ends of the oven and in cooperative relation with the oven conveyer are transfer mechanisms indicated at 43 and 43' respectively. Figs. 8 and 9 particularly illustrate the transfer mechanism 43 at the forward end of the oven or the loading end of the oven conveyer. Figs. 10, 11 and 12 particularly illustrate the transfer mechanism 43' at the rearward end of the oven or the unloading end of the conveyer.

Considering the transfer mechanism 43, it will be seen that it is in alignment and juxtaposed with respect to a transverse conveyer 44 comprising a channel-shaped guide member 45 and rollers 46 between the flanges of the guide over which the boards are moved by a chain drive 47 having a plurality of spaced dogs 48 thereon, the latter being adapted to engage the vertical edges of the boards. Suitable guide means (not shown) at the upper end of the transverse conveyer maintain the boards in vertical position. The means for transferring the board to the oven conveyer from the transverse conveyer comprises a vertically reciprocable frame 49 mounted on links 50, each pivoted at one end to the frame and at its other end to a base 51. A rotatable cam 52 is designed to cooperate with rollers 53 journaled on a flange 54 on frame 49 to maintain a board in elevated relation to conveyer parts 26 as the board is pushed therebetween by one of the dogs 48 and to subsequently lower the board to rest on the bars 27 when centered thereon.

To assure transfer of a board to the oven conveyer without interference by any of the boards carried by the oven conveyer, even if they are warped, means is provided for holding the nearest board in non-interfering position by holding the lower end of the nearest board spaced away from the transfer mechanism in the direction taken by the oven conveyer while another board is being transferred to the oven conveyer. Also, means is provided for moving the lower end of the board being transferred to non-interfering position. As shown, 55 are levers of general U shape in side elevation for moving the lower end of the board while it is being lowered upon the oven conveyer. Each lever 55 is pivotally mounted intermediate the ends of its lower arm at 56 upon the bracket 57, the pivot being preferably below the transverse center of the frame 49. The bracket 57 is mounted upon the base 51. The upper arm of each lever extends through an upwardly opening slot 58 in the flange 54' on the frame 49 and an opening 59 in the flange 54, the free end of the arm being curved upwardly. The flange 54 is of greater height than the flange 54' and serves to position the lower end of the board while the board is being pushed to place. Brackets 60 are secured to the under side of the frame 49 and carry the rollers 61, there being one roller for each lever. Each roller upon lowering of the frame is engageable with the upper side of the lower arm of the associated lever between the pivot 56 and the upright portion of the lever to swing the lever in a clockwise direction, as seen in Fig. 9. The height of the opening 59 is sufficient to allow the free end of the lever to move therethrough and to engage the lower end of the board and swing it to the position indicated at A in Fig. 9, this position being reached when the frame has become fully lowered.

For normally maintaining the levers in their inoperative position, shown in full lines in Fig. 9, the free ends of the lower arms are preferably counterweighted as by means of lead poured into the cups formed at the free ends.

For holding the board in this position, there are the pivotal dogs 62 engageable with the lower end of the board, the latter riding over and temporarily depressing the dogs. The dogs are pivotally mounted at 63 upon the brackets 64 which are mounted on the base 51. Suitable means, such as the weights 65, normally hold the dogs in their operative positions and these positions are determined by suitable means, such as the adjustable stops 66, engageable with the weighted arms 67, the stops being adjustably mounted on the brackets 64.

For the purpose of preventing the flanges at the lower ends of the boards from becoming overlapped, especially when the boards are being tilted by swinging their lower ends, stops 68 are provided upon the lower flanges 24. These stops are in the nature of angle clips similarly positioned upon the flanges and having upstanding portions of a height to prevent overlapping.

The oven conveyer, the transverse conveyer and the transfer mechanism operate intermittently and alternately in timed relation so that the oven conveyer remains stationary while a board is being positioned thereon. In like manner the transverse conveyer is stationary during movement of the oven conveyer. Suitable mechanical or electrical apparatus, or a combination of both, may be used for controlling movement of the conveyer in proper timed relation.

The transfer mechanism 43' employed at the rearward or discharge end of the oven is arranged to elevate a board with respect to bars 27 to permit its removal from the oven conveyer by dogs on the chain associated with a second transverse conveyer generally similar to the conveyer 44. This mechanism is also driven in timed relation to the oven conveyer by suitable control devices or by the mechanism controlling movement of transverse conveyer 44.

The transfer mechanism 43' has the vertically reciprocable frame 69 mounted on links 70, each pivoted at one end to the frame and at the other end to a base 71. A rotatable cam 72 is designed to cooperate with roller 73 journaled on the frame to raise the frame and allow it to lower, springs 74 being provided to assist in the lowering. When the frame is raised, it raises a board in registration therewith to an elevation out of supporting relation to the oven conveyer so that the board may be pushed from the oven conveyer to the second transverse conveyer.

To prevent interference with a board being removed by the remaining boards on the oven conveyer, there is the stop 75 mounted on links 76 and 76'. Both of these links are pivoted to the stop 75 and the frame 69. The link 76, in addition, is pivotally connected to the adjustable link 77, the lower end of which is pivotally connected to the base 71. The construction is such that the stop is raised and lowered simultaneously with, but at a faster rate than the frame. As a result, the stop will be elevated to a greater height than the frame and its board supporting rollers 78 when both are in their uppermost positions, although both may be at substantially the same height when lowered, as shown in Fig. 11. When the stop is in its uppermost position, it is adapted to be engaged by the lower end of the adjacent board carried by the oven conveyer.

79 are positioning members operable in timed relation to the frame 69 and stop 75 and located to engage the opposite vertical ends of the board nearest the board about to be removed. These positioning members are movable to operative board engaging position upon lowering of the frame and stop and serve to hold the board nearest that about to be removed in tilted relation, as shown in Fig. 11, so that it can not interfere with the removal operation. It will also be noted that several boards back of the nearest board are also tilted so that they increase the pressure tending to swing the nearest board to vertical position. As shown particularly in Fig. 10, the positioning members 79 are secured to the upper ends of the bell-cranks 80 pivotally mounted upon the base 71. The other ends of the bell-cranks are pivotally connected to the links 81, which are in turn pivotally connected to the frame 69.

In operation, assuming the parts to be in the positions shown in Figs. 10, 11 and 12, the frame 69 and stop 75 are raised through rotation of the cam 72. During the raising, the rollers 78 engage the lower end of the board in registration therewith and raise this board out of supporting relation to the oven conveyer, so that this board may be removed. During the raising, the stop 75 is raised at a faster rate than the frame and assumes an elevated position to engage the lower end of the board released from the positioning members 79 by outward swinging of these members. The release is sufficiently late to assure engagement of the stop by the released board. After removal of the first board, the frame and stop are lowered and before the stop has become disengaged from the board positioned thereby, the positioning members are forced between the board positioned by the stop and the adjacent board. To facilitate entrance of the positioning members and to assure separation of the boards engaged by these members, their front ends are preferably wedge-shaped. Upon continued downward movement of the frame and stop, the latter is disengaged from the board positioned thereby and allows this board to assume a vertical position. At this time, the parts are again in the positions shown in Figs. 10, 11 and 12.

As shown in Fig. 7, the means for supporting a board on the T-shaped bars of the oven conveyer may be modified to provide a trolley having a yoke or forked member 82 on which are journaled a plurality of rollers 83. The yoke straddles the flange 84 of the conveyer bar similar to the bar 27 to permit the rollers to engage the two faces thereof. In this form of the invention, the boards are suspended directly under the bars rather than between them, as is done when the boards are provided with T-ends.

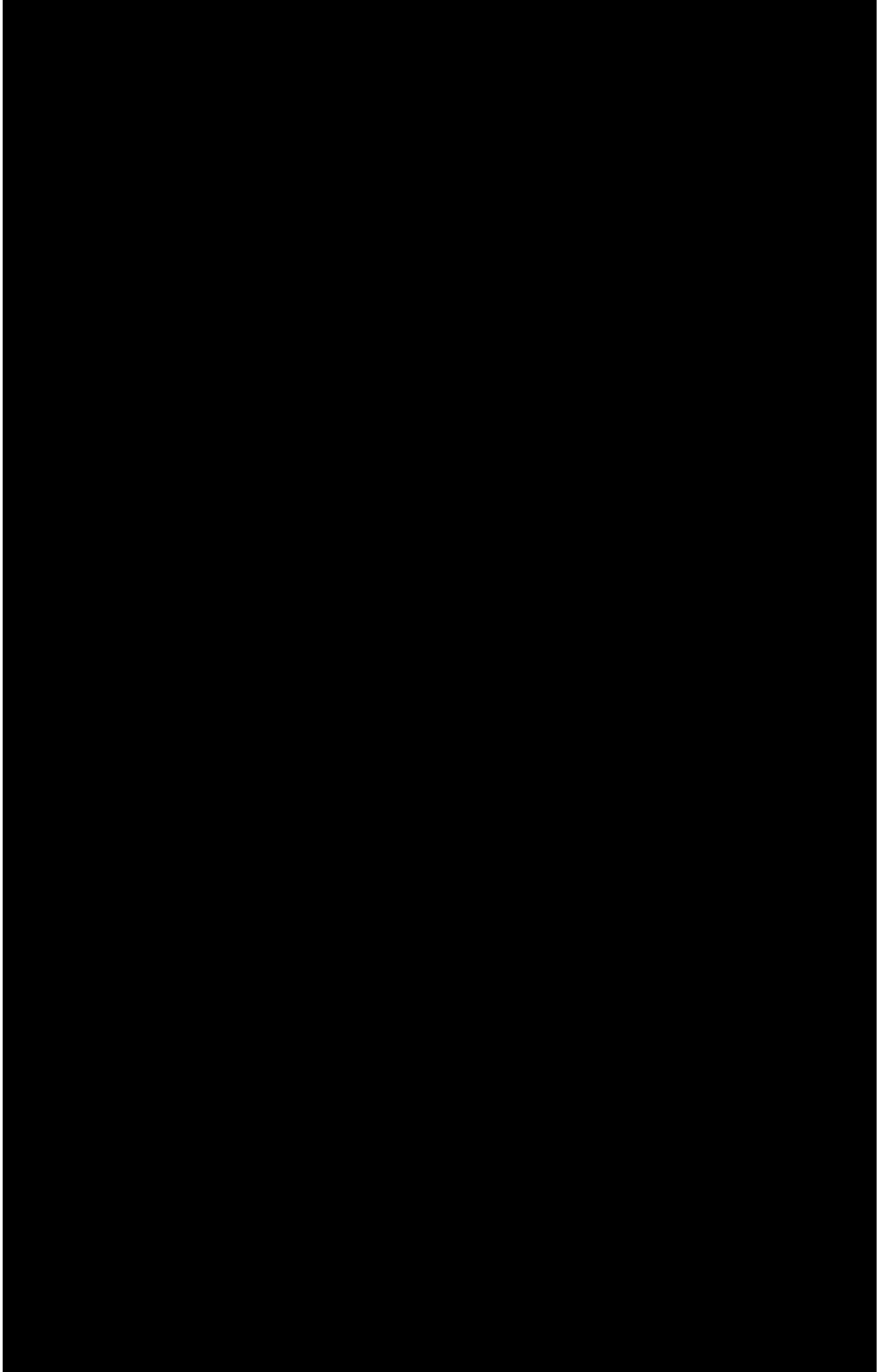

While the arrangement of the oven chamber and lateral bays is applicable to a single conveyer passing through the oven, there are shown in the drawings two parallel conveyers 17, 17', the drive shaft 14' and gear 22' for the latter conveyer and conveyer bars 27' corresponding with those on the other of the conveyers. The dual arrangement of the conveyers is used where economy of space is desired and where two lines of conveyers are utilized to move the boards to